United States Patent [19]
Pernicka et al.

[11] 3,964,782
[45] June 22, 1976

[54] INTERLOCKING WELDED CONSTRUCTION FOR ROLL OVER PROTECTIVE STRUCTURES

[75] Inventors: Henry A. Pernicka, Glen Ellyn; R. Dale Moore, Aurora, both of Ill.

[73] Assignee: International Harvester Company, Chicago, Ill.

[22] Filed: Feb. 5, 1975

[21] Appl. No.: 547,297

[52] U.S. Cl. ............................... 296/102; 403/231
[51] Int. Cl.² .......................................... B62D 25/06
[58] Field of Search .................... 280/150 C, 106 R; 296/102; 403/231, 219, 172, 401, 176, 363, 382, 403; 52/758 B, 758 H, 758 A; 228/135

[56] References Cited
UNITED STATES PATENTS

| | | | |
|---|---|---|---|
| 3,244,251 | 4/1966 | Duncan | 280/150 C |
| 3,632,134 | 1/1972 | Babbitt | 296/102 |
| 3,785,696 | 1/1974 | Moore | 296/102 |
| 3,791,668 | 2/1974 | Adams | 280/150 C |

*Primary Examiner*—Robert R. Song
*Attorney, Agent, or Firm*—Douglas W. Rudy; Floyd B. Harman

[57] ABSTRACT

A roll over protective structure for use on tractors to protect the vehicle operator in the case of an upset. Interlocking mating of structural frame members is accomplished by using metal tubing having cross sectional shapes of complementary dimensions such that structural members can be inserted into other members of the structure having compatible internal dimensions and shapes.

11 Claims, 5 Drawing Figures

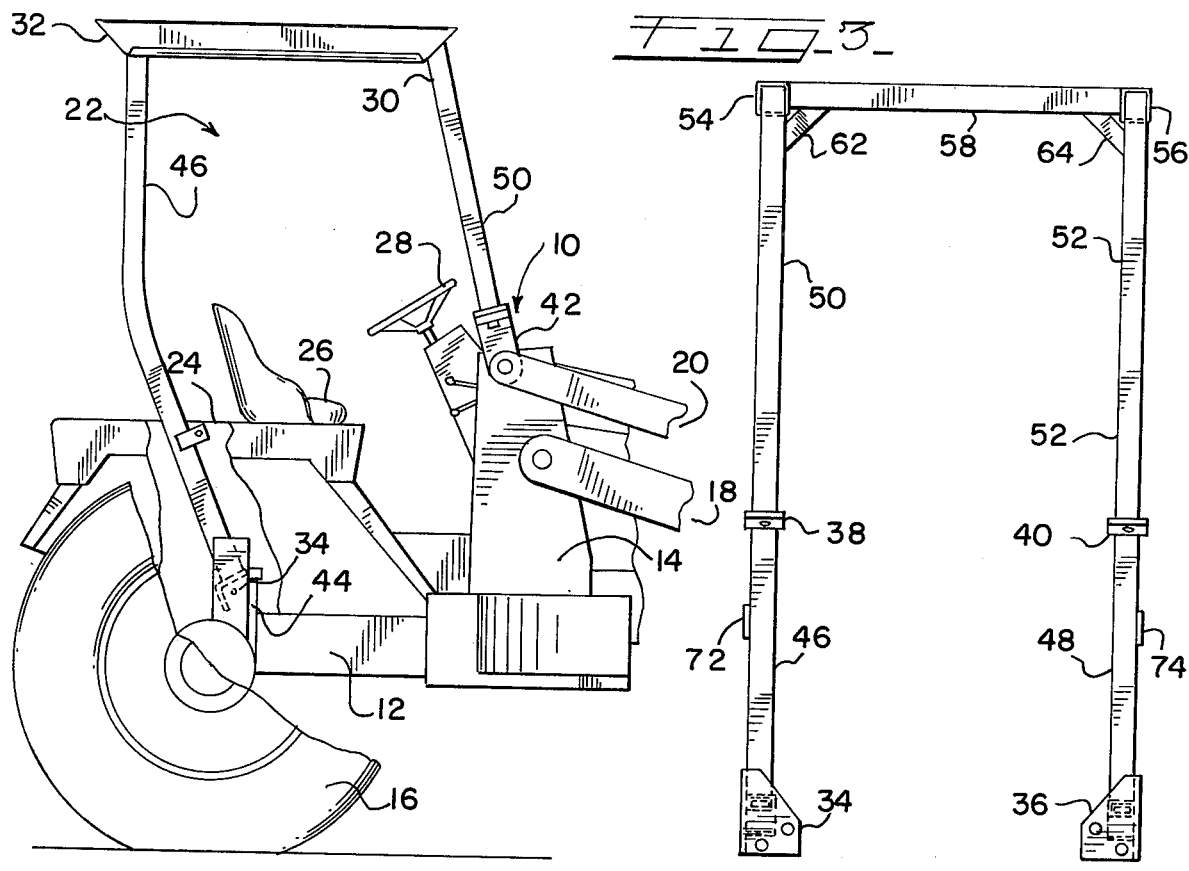
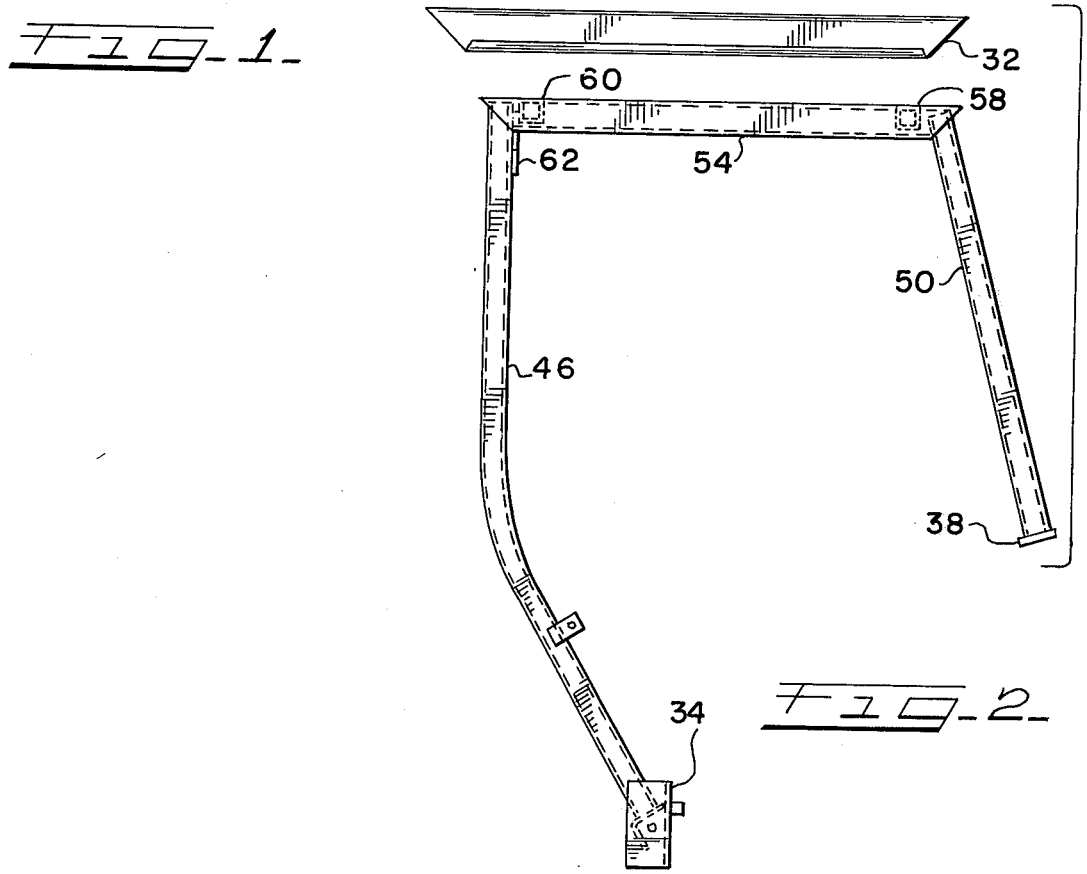

INTERLOCKING WELDED CONSTRUCTION FOR ROLL OVER PROTECTIVE STRUCTURES

BACKGROUND OF THE INVENTION

This invention relates to roll over protective structures and falling object protective structures which are desirable and in many instances mandatory on farm, industrial, lawn, and utility tractors, earth moving equipment and other operator controlled vehicles where the operator is exposed to injury from such things as vehicle upset, roll over, penetration of the operator's working zone by falling objects such as steel work, trees, rocks, etc. More specifically the invention is concerned with roll over and falling object protective structures that have added strength and durability through the use of interlocking structural members which are welded together after positioning.

In light of the ever increasing awareness of the advantages of providing a zone of safety for exposed vehicle operators the unexpected result discovered through the interlocking of the roll over protective structure's structural members provides greater margins of safety and structural performance.

There are many types and configurations of roll over and falling object protective structures now in use on an extensive range of tractors and earth moving equipment. Roll over structures are usually of a multiple upright post design having connecting members between the upright posts. The structure framework on most current designs is assembled from either round, square, channel or tapered metal tubing. These structures are usually butt welded together at joints and, where necessary, gusseted for added strength.

Falling object structures generally are constructed using the framework of roll over protective structures with the inclusion of a perforated or solid metal plate that fits over the top of the supporting framework.

The upright posts or supports of roll over protective structures are usually fixedly attached to sturdy components of the tractor or vehicles such as axle housings, main frame sections or specially constructed support mounts. Assembly members connect the posts to one another in a manner that is designed to give the structure rigidity.

Upon vehicle upset the roll over protective structures will be subject to forces that will eminate from the upper parts of the structure as this area will be the first to make contact with the ground (or with falling objects). In design configuration the members that tie together the upright posts of the structure will tend to distribute initial load throughout the structure. The process of channeling impact stresses can impose severe forces on fabrication welds at the fixed joints of the roll over or falling object protective structure. As a matter of research it has been observed that in order to minimize the possibility of a protective device failure extensive gusseting and reinforcement of the structure has been necessary.

The invention disclosed here has shown that a very rigid structure can be fabricated with excellent results through the interlocking of structural support members. This is accomplished by fabricating a roll over protective structure with the upright posts of a square tube having four wall surfaces and the horizontal connecting members which may be oriented either perpendicularly or parallel to the longitudinal centerline of the vehicle, of a similar square tube only having an interior dimension approximately equal to the exterior dimension of the upright posts.

By assembling the structure in this manner there is a gusseted effect formed between the the larger section posts and the connecting frame member. After these members have been assembled together they can be welded at the joints that are a consequence of their different but complementary dimensions. The effect of the flat surface interior of the transverse members in relationship to the flat exterior surface of the vertical post members has the effect of an instant gusset. This means, of course, that there exists no need to fabricate an exterior ancillary gusset for this structure joint.

This particular improvement over roll over and falling object protective structures permits the structure to transfer energy without giving rise to weld failures that would cause structure deformation which would be injurious to the vehicle operator positioned within the protective structure.

In the embodiment of the present invention it is also proposed that the upright posts could be of larger internal dimensions than the horizontal connecting members and thus fit around the post connecting members. Also rectangular shaped metal tubing and various combinations of channel section components are anticipated.

Accordingly it is amongst the primary objects of this invention to provide a roll over and falling object protective structure for use on tractors that will reasonably protect the vehicle operator in dire situations such as upset, roll over and exposure to falling objects.

Another object of the invention to to provide a method of roll over protective structure fabrication that adopts itself to good welding.

Many of the present roll over protective structure configurations provide adequate strength, however, the quantity of steel work, the need of extreme care to machine surfaces such that good weldments can be made and the attendant high fabrication costs make these structures less desirable in light of the instant invention. Many of the structural components do not require close machine work as is needed when butt welding similar non-interlocked structures together. All that need be done here is to cut out one member of the interlocking structure on a bias angle and the other on either a complementary angle or a straight angle. After fitting these components together there is formed a ledge between components that provides an excellent weld bed.

Consequently, it is also an object of the invention to enable roll over protective structures to be fabricated at less expense than is presently incurred.

A further object of the invention is to minimize the amount of preparatory machining of component structural members.

SUMMARY OF THE INVENTION

In accordance with the invention the roll over protective structure is an assembly constructed of rectangular metal tubes having a plurality of upright posts attached to a vehicle frame. The upright posts are straight cut on the uppermost end and a transverse member of larger inside dimension than the outside dimension of the upright posts is positioned around the upright posts such that each rear upright post is interlockingly linked to a forward upright post. These interlocked components, which fit closely together, are welded around the periphery of the joint as defined by the biasly cut transverse member to form a solidly interlocked and welded structure.

A set of auxiliary cross members connect the right side of the structure (consisting of a rear and a forward post linked together with the aforementioned interlocking transverse member) to the left side of the structure (consisting of a rear and a forward post linked together with an interlocking transverse member) by being butt welded to the interlocking transverse members. The rear cross members are further strengthened in their position by braces welded both to each of the rear uprights and each of the transverse members.

A steel canopy constituting a falling object protective structure is affixed in position on top of the roll over protective structure in order to provide a safety zone for the operator such that he is protected from falling objects. This canopy also acts as a sunshade and umbrella.

BRIEF DESCRIPTION OF THE DRAWINGS

Other objects and advantages of the invention will become apparent upon reading the following detailed description and upon reference to the drawings in which:

FIG. 1 is a side elevation view showing a roll over protective structure of the present invention mounted on a fragmentary stylized presentation of a tractor vehicle;

FIG. 2 is a side elevation view of the roll over protective structure dissociated from the tractor of FIG. 1;

FIG. 3 is a front elevation view of the roll over protective structure of FIG. 2;

DESCRIPTION OF THE PREFERRED EMBODIMENT

Figure 4:
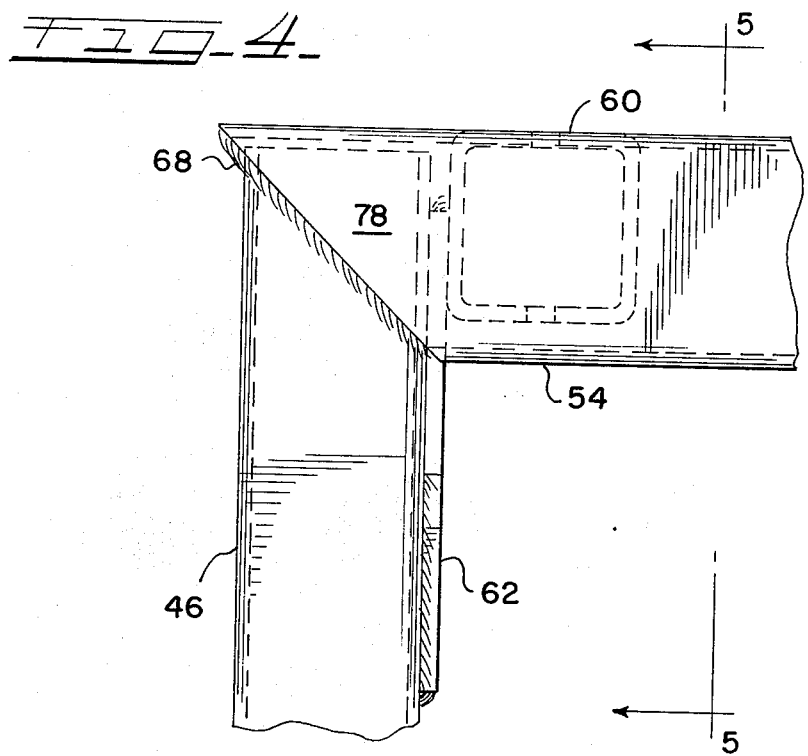
FIG. 4 is a fragmentary side elevation view of a section of the roll over protective structure showing an interlocking joint.

An illustration of the tractor equipment in which the present invention is incorporated is shown in FIG. 1. This figure is a stylized representation of a fragmentized portion of an industrial tractor 10 having a main frame 12 which is mounted on driving wheels 16 and steerable wheels which are not shown. Attached to the main frame 12 is an upright frame stanchion 14 that together with the steering means 28, the tractor seat 26, a roll over protective structure 30 and the vehicle rear fenders 24 (of which only one is shown) generally define the boundaries of the operator's work station 22.

Positions of tractor components are determined from the usual position of an operator as he sits facing forward in the seat grasping the steering wheel. The right side of the tractor corresponds to the right hand of the operator.

The rectangular tubing used to construct the roll over protective structure of this invention is a tube having four walls with interior and exterior surfaces. When the rectangular tubing is used as an interlocking transverse member the uppermost wall of the tubing is referred to as the top wall, the bottom wall is separated from the top wall by sidewalls. When the rectangular tubing is used in an upright position the front wall of the tube corresponds to the front of the vehicle while the back wall corresponds to the back of the vehicle. Sidewalls connect the front and back walls to each other.

Pivotally attached to the frame stanchion 14 forward of the operator's work station is a loader boom 18 and a loader boom link 20 which usually carries a pivotally mounted loader bucket (loader bucket and operating means not shown).

A roll over protective structure 30 is fixedly attached to the frame termination plate 44 at the trailing end of the main frame 12 through the right and left rear mounting means 34 and 36 (FIG. 3) respectively. FIG. 3 shows right (also FIG. 1) and left rear upright posts 46 and 48 which are inclined rearward at their respective lower sections and bend in their midsection to terminate in a vertical upright position at their upper sections, which are fixedly attached to the corresponding right and left rear mounting means 34 and 36.

Rear fenders, the right one shown as 24, are fixedly attached to each of the rear upright posts, 46 and 48 through the implementation of right and left fender support flanges 72 and 74, respectively. The forward section of the roll over protective structure is fixedly attached to the tractor vehicle via the means provided through the right 42 (FIG. 1) and left (not shown) front support brackets which are fixedly attached to either side of the frame stanchion 14. Right and left front mounting plates, 38 and 40 (FIG. 3) are fixedly attached to the front support brackets (one shown at 42) on the lower surface and on the upper surface to the right and left front upright posts, 50 and 52 which are slightly inclined towards the rear of the vehicle. A falling object protection canopy 32 is shown in FIG. 1 in normal position on top of the roll over protective structure 30.

The preferred embodiment of the invention is most clearly seen when looking at FIGS. 2 and 3 where the right 34 and left 36 rear mounting means are fixedly attached to the right 46 and left 48 rear upright posts. Interlockingly connected to these rear posts are horizontal connecting members, namely right and left interlocking transverse members 54 and 56 which extend forward to and interlock with each respective right and left front upright post 50 and 52. Left and right front mounting plates 38 and 40 are fixedly attached to the front upright posts. Front cross member 58 as well as rear cross member 60 are fixedly attached between the interlocking transverse members in order to provide structural unity and spacing between the left and right sides of the structure. Rear cross member 60 is further supported in its position through right and left braces 62 and 64 which are fixedly attached to the rear cross member and to the left and right rear upright posts respectively. Shown in FIG. 2 is a falling object protective canopy 32 exploded away from its normal mounted position. When in position this canopy is mounted to the front and rear cross members with fasteners.

Referring to FIG. 4 it is seen that the right rear upright post 46, having a straight cut upper end, has been partially enveloped by a biasly cut interlocking transverse member 54. These recited components are fixedly attached through the means of a weld 68 that follows the jointed surfaces of the two components completely around the assembly margin. An instant gusset, generally depicted as 78, is the result of the aforementioned interlocking. Rear cross member 60 appears behind interlocking transverse member 54. One end of brace 62 is fixedly attached to the rear upright post 46 and the other end is also fixedly attached to rear cross member 60.

In the embodiment of the present invention it is also proposed that the upright posts could be of larger internal dimensions than the horizontal connecting members and thus fit around the horizontal connecting members.

Figure 5:
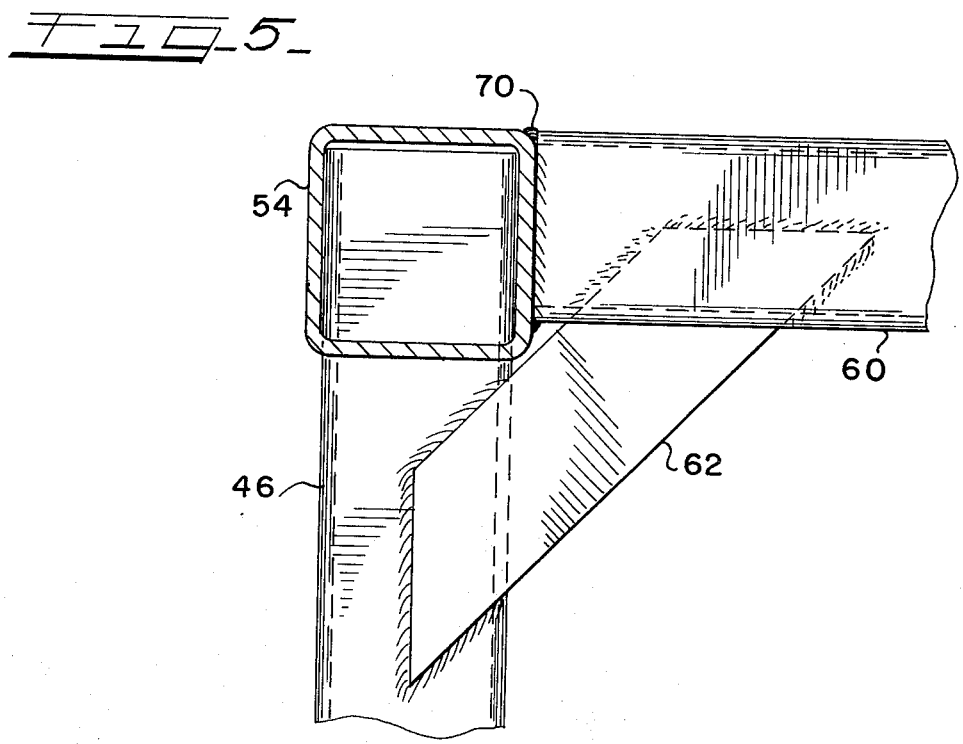
FIG. 5 is a section view of FIG. 4 above taken through plane 5—5.

The end view of FIG. 4 is depicted in FIG. 5 shows the interlocking transverse member 54, having been machined on a bias at each end, enveloping and being fixedly attached to the rear upright post 46. Brace 62 is fixedly attached to rear upright post 46 and cross member 60 which is also welded to interlocking transverse member 54 at the interface 70.

The preferred embodiment as just recited may also be augmented by the use of a horizontal connecting member that is positioned perpendicular to the longitudinal centerline of the vehicle and connects the left side and the right side of the frame together by enveloping ends of the frame upright or alternatively the transverse members.

Thus, it is apparent that there has been provided, in accordance with the invention, a roll over and falling object protective structure having an interlocking welded construction that fully satisfies the objects and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

What is claimed is:

1. In a tractor having a mobile frame with steerable wheels and traction wheels including a main frame, a main frame termination plate, an operator's work area, an upwardly extending frame stanchion positioned forward of the operator's work area, providing rear attachment location for front loader boom pivotal attachment means and housing means for the tractor firewall and dashboard; the improvement comprising:
    a first pair of mounting means fixedly attached to the main frame termination plate of the tractor;
    a rear pair of upwardly extending posts secured at one end to said first pair of mounting means, said posts being of hollow square metal tubing;
    a second pair of mounting means fixedly attached to the left and right side of the upwardly extending frame stanchion;
    a front pair of upright posts secured at one end to said second pair of mounting means, said front pair of upright posts being of hollow square metal tubing;
    a pair of transverse members extending fore-and-aft from each rear upright post and each front upright post;
    said pair of transverse members being of hollow square tubing with each end of each said member being cut on a bias angle;
    said transverse members being formed of square tubing having the inside dimension of said tubing equivalent to the exterior dimension of the square tubing of said rear and front pairs of upright posts;
    each of said transverse members positioned over the uppermost end of one of each pair of said front and rear upright posts thereby linking one of each said front posts to one of each said rear upright posts through the insertion of said posts into said biasly cut end of said transverse members;
    weld means securing said upright posts to said transverse members;
    a pair of cross members of square tubing each fixedly attached at one end to the right said transverse member and at the other end to the left said transverse member.

2. The tractor as of claim 1 and further including mounting flanges on said rear upright posts for affixing rear tractor fenders to said rear upright posts.

3. The tractor as in claim 1 further including a falling object protective canopy of metal plate fixedly attached to the uppermost surface of said cross members.

4. In a tractor having a mobile frame with steerable wheels and traction wheels including a main frame, a main frame termination plate, an operator's work area, an upwardly extending frame stanchion forward of the operator's work area providing rear attachment location for front loader boom pivotal attachment means and housing means for the tractor firewall and dashboard; the improvement comprising:
    a first pair of mounting means fixedly attached to the main frame termination plate of the tractor;
    a rear pair of upwardly extending posts secured at one end to said first pair of mounting means, said posts being of hollow square metal tubing having the upper end cut on a bias angle from the rear surface downward to the front surface;
    a second pair of mounting means fixedly attached to the left and right side of the upwardly extending frame stanchion;
    a front pair of upright posts secured at one end to said second pair of mounting means, said front pair of upright posts being of hollow square metal tubing having the upper end cut on a bias from the front surface downward to the rear surface;
    a pair of transverse members of hollow square tubing extending fore-and-aft from each rear upright post and each front upright post;
    said transverse members being formed of square tubing having the outside dimension of said tubing equivalent to the interior dimension of the square tubing of said rear and front pairs of upright posts;
    each of said transverse members positioned in the uppermost end of one of each pair of said front and rear upright posts thereby linking one of each said front posts to one of each said rear upright posts through the insertion of said transverse members into said biasly cut ends of said posts;
    weld means securing said upright posts to said transverse members;
    a pair of cross members of square tubing each fixedly attached at one end to the right said transverse member and at the other end to the left said transverse member.

5. In a rollover protective structure for use on a vehicle, the improvement comprising:
    upwardly extending rectangular posts having front, rear and front-to-rear sidewalls attached to the vehicle;
    interlocking transverse members of rectangular tubing having top, bottom and top-to-bottom sidewalls mated to said upwardly extending rectangular posts;
    one of the upwardly extending rectangular posts and the interlocking transverse members equipped with biasly cut ends and the other having an outside sidewall-to-sidewall dimension similar to the inside sidewall-to-sidewall dimension of the biasly cut member allowing association of the upwardly extending post and the interlocking transverse member in an enveloping manner;

weld means securing the top wall of said interlocking transverse members to the upwardly extending posts.

6. A roll over protective structure for use on a vehicle wherein said roll over protective structure comprises:
a front upwardly extending post of rectangular tubing;
a rear upwardly extending post of rectangular tubing;
an interlocking transverse member of rectangular tubing having a first and a second end each formed on an angle resulting in a top wall of said rectangular tube being longer than the other walls of said rectangular tube, said first end of said transverse member having a sidewall-to-sidewall internal dimension substantially similar to the sidewall-to-sidewall exterior dimension of said front post, in said second end of said transverse member having a sidewall-to-sidewall internal dimension substantially similar to the sidewall-to-sidewall exterior dimension of said rear post where said first and said second ends are fitted over said front and said rear posts respectively.

7. The invention in accordance with claim 6 wherein said rollover protective structure further comprises:
a cross member extending between of a plurality of assemblies of rear upwardly extending posts and front upwardly extending posts linked together by interlocking transverse members.

8. The invention in accordance with claim 6 wherein the roll over protective structure further comprises:
a front upwardly extending post of rectangular tubing having an uppermost end truncated on a bias angle such that the forward wall of said rectangular tube extends upwardly further than a rear wall of said rectangular tube;
a rear upwardly extending post of rectangular tubing;
an interlocking transverse member of rectangular tubing having a first and a second end, the second end formed on an angle resulting in a top wall of said rectangular tube being longer than the other walls of said tube, said second end of said transverse member having a sidewall-to-sidewall internal dimension substantially similar to the sidewall-to-sidewall exterior dimension of said rear post where said interlocking transverse member is fitted over said rear upwardly extending post, and further said interlocking transverse member has a first end having a sidewall-to-sidewall exterior dimension substantially similar to the sidewall-to-sidewall internal dimension of said front post where said interlocking transverse member is fitted into said front upwardly extending post.

9. The invention in accordance with claim 8 wherein said roll over protective structure further comprises:
a cross member extending between a plurality of assemblies of rear upwardly extending posts and front upwardly extending posts linked together by interlocking transverse members.

10. The invention in accordance with claim 6 wherein the roll over protective structure further comprises:
a front upwardly extending post of rectangular tubing;
a rear upwardly extending post of rectangular tubing having an uppermost end truncated on a bias angle such that the rear wall of said rectangular tube extends upwardly further than a forward wall of said rectangular tube;
an interlocking transverse member of rectangular tubing having a first and a second end, the first end formed on an angle resulting in a top wall of said rectangular tube being longer than the other walls of said tube, said first end of said transverse member having a sidewall-to-sidewall internal dimension substantially similar to the sidewall-to-sidewall exterior dimenision of said front post where said interlocking transverse member is fitted over said front upwardly extending post, and further said interlocking transverse member has a second end having a sidewall-to-sidewall exterior dimension substantially similar to the sidewall-to-sidewall internal dimension of said rear post where said interlocking transverse member is fitted into said rear upwardly extending post.

11. The invention in accordance with the claim 10 wherein said roll over protective structure further comprises:
a cross member extending between a plurality of assemblies of rear upwardly extending posts and front upwardly extending posts linked together by interlocking transverse members.

* * * * *